No. 751,006. PATENTED FEB. 2, 1904.
H. H. POE.
BRIDLE.
APPLICATION FILED MAY 31, 1902.
NO MODEL. 2 SHEETS—SHEET 1.
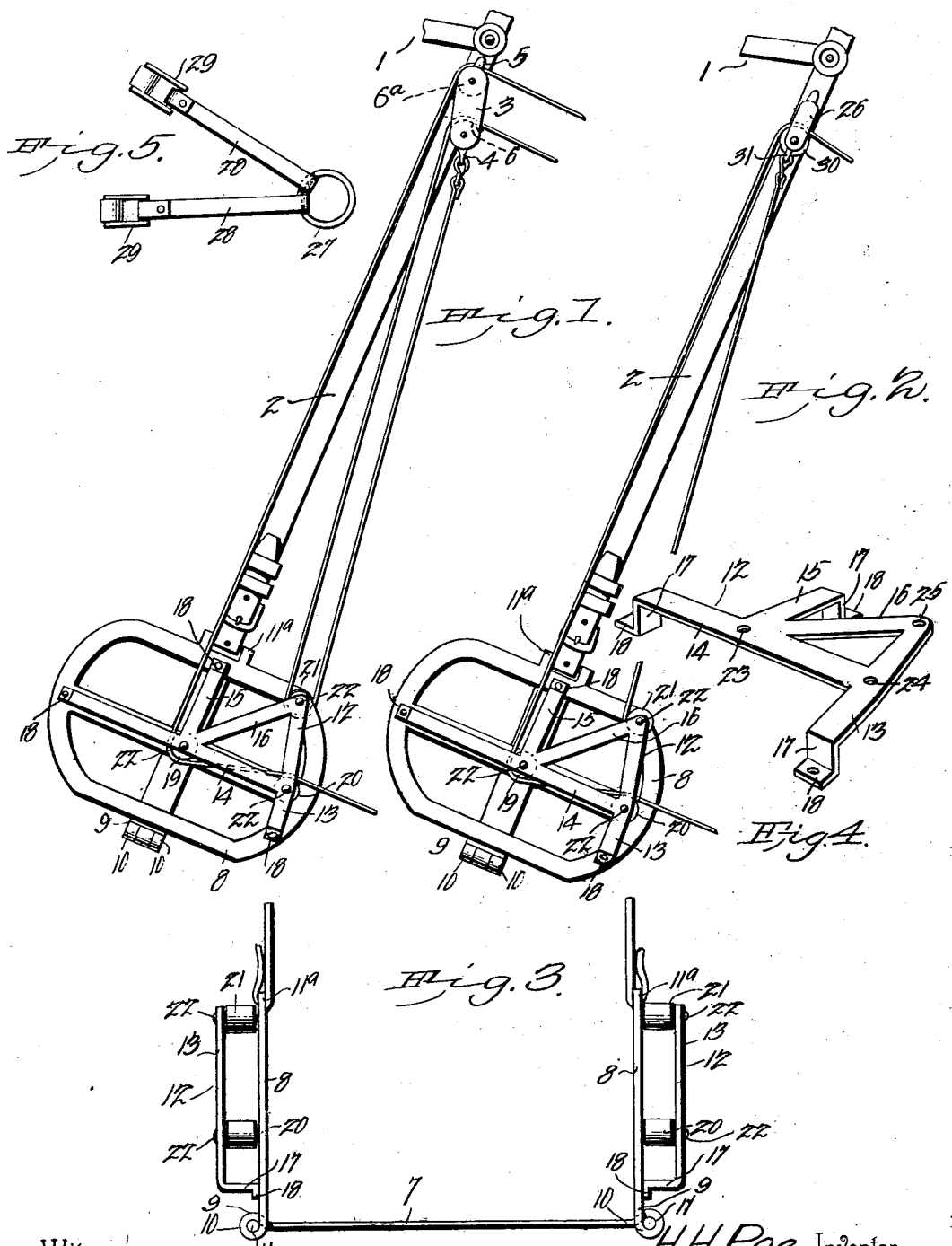

No. 751,006. PATENTED FEB. 2, 1904.
H. H. POE.
BRIDLE.
APPLICATION FILED MAY 31, 1902.
NO MODEL. 2 SHEETS—SHEET 2.
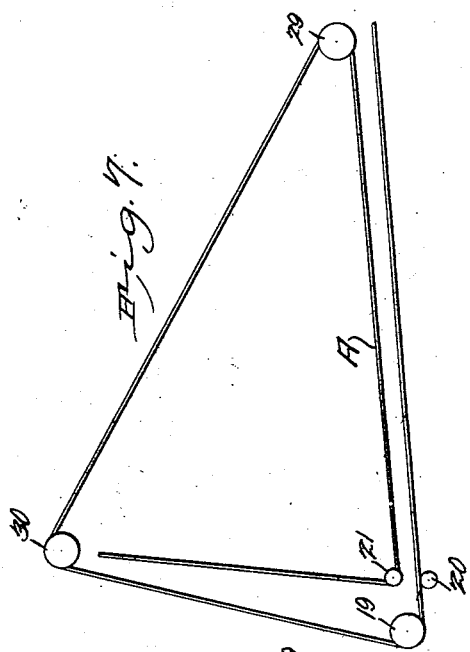
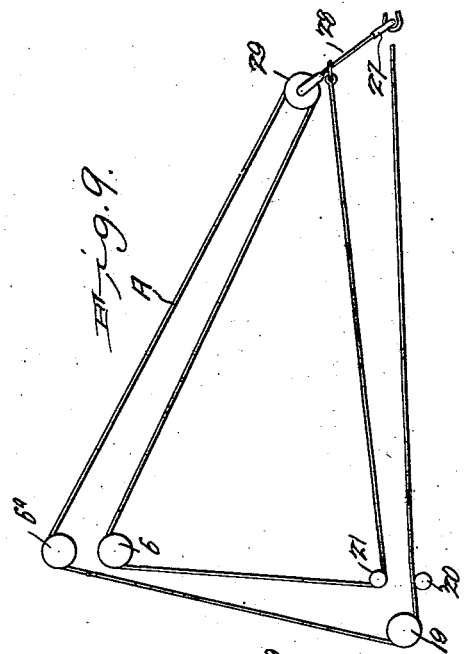
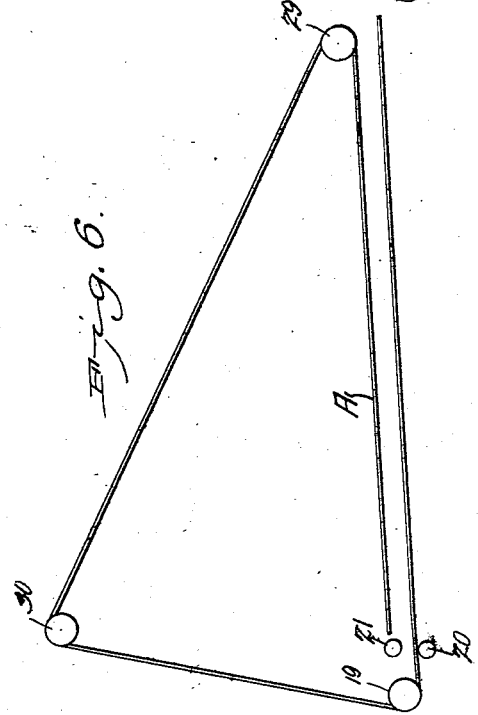
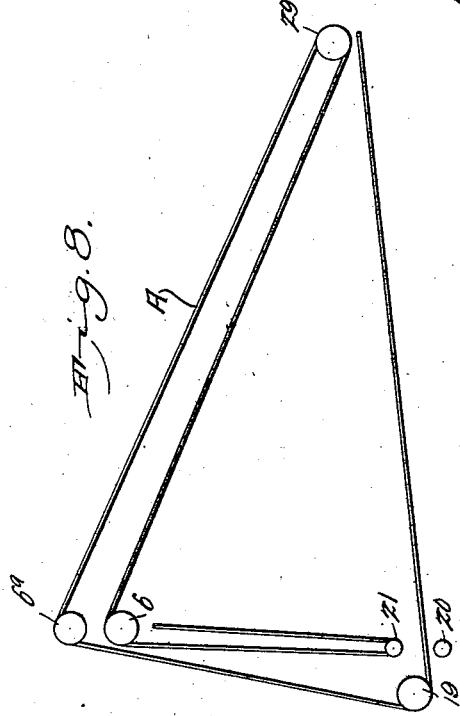
Witnesses
H. H. Poe, Inventor.
by C. A. Snow & Co
Attorneys No. 751,006. Patented February 2, 1904.

UNITED STATES PATENT OFFICE.

HENRY H. POE, OF MORVEN, GEORGIA.

BRIDLE.

SPECIFICATION forming part of Letters Patent No. 751,006, dated February 2, 1904.

Application filed May 31, 1902. Serial No. 109,752. (No model.)

*To all whom it may concern:*

Be it known that I, HENRY H. POE, a citizen of the United States, residing at Morven, in the county of Brooks and State of Georgia, have invented a new and useful Bridle, of which the following is a specification.

This invention relates generally to bridles, and particularly to that class known as "safety-bridles."

The object of the invention is to present a bridle and adjunctive mechanism coacting therewith which shall in a simple, thoroughly effective, and practical manner operate perfectly to control an unruly horse.

By the structure hereinafter defined a powerful draft upon the bit is secured with the output of but a small amount of energy on the part of the driver, so that a bit may be instantly raised in an animal's mouth and forced from between its teeth should it show any tendency to catch the same and raise its head, so that he cannot kick, and, further, a strain may exerted on the animal's head and mouth which will instantly bring it under control of the driver.

The bridle and its appendages are constructed with a view to managing vicious or spirited animals; but it may be used in connection with animals of gentle disposition in the same manner as an ordinary bridle and with perfect ease to the animal, and when employed in checking an unruly animal will not injure it, but will result in a positive manner in the animal being brought under perfect restraint. The power which will be hereinafter shown is so simple, effective, and powerful that it will not require more than one-third of the power usually required for this purpose.

With these and other objects in view, as will appear as the nature of the invention is better understood, the same consists in the novel construction and combination of parts of a bridle and its appendages, as will be hereinafter fully described and claimed.

In the accompanying drawings, forming a part of this specification, and in which like numerals of reference indicate corresponding parts, there are illustrated two forms of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in side elevation, exhibiting one form of embodiment of the invention. Fig. 2 is a similar view of another form of embodiment thereof. Fig. 3 is a view in front elevation of the bit. Fig. 4 is a perspective detached detail view of a bridge associated with the bit-plates for holding the sheaves or rolls in operative relation to the plates and also for bracing the same. Fig. 5 is a detail view of a sheave-bearing line-guide to be associated with the saddle. Figs. 6, 7, 8, and 9 are diagrammatic views exhibiting different ways in which the lines are disposed for effecting the desired draft on the bit.

The bit herein shown is in all substantial respects the counterpart of a bit shown and described in a patent granted to me for a bridle, dated December 2, 1902, No. 714,945.

Referring to the drawings, 1 designates the headstall, and 2 one of the cheek-straps of an ordinary bridle, and as these parts may be of usual or any preferred construction further description thereof is deemed unnecessary. The safety attachments on each side of the bridle are counterparts of each other, so that a description of one will serve for both. Secured in any suitable manner to the headstall (shown in Fig. 1) is a double-sheaved gag-runner 3, the lower end of which is provided with a loop or extension 4 and its upper end with a loop 5, which is suitably secured to the headstall, the sheaves 6 6$^a$, carried by the frame of the gag-runner, being either grooved or flat, as may be preferred, grooved sheaves being employed when the reins are round and plain cylindrical sheaves being used when the reins are flat.

The bit 7, which may be of any preferred style, is carried by two bit-plates 8, each being by preference a skeleton structure for the purpose of lightness and approximately rectangular in form with rounded ends. The plate is provided at its lower side with a transversely-orificed ear 9, comprising two members 10, between which the extremities of the bit are mounted, a pin 11, passed through the ears and through a ring or opening in the end of the bit, serving to hold the parts assembled. The pin 11 is made detachable and may be a bolt, so that when it is desired to change the character of the bit—that is to say, to substitute a bit of one style for that of another—this may be readily accomplished. The cheek-strap 2 is connected with the bit-plate by being passed through a loop 11ª, formed on the upper side of the plate, the usual form of buckle connection being provided at the lower end of the strap to permit of the requisite adjustment. Secured to the plate is a bridge 12, comprising four members 13, 14, 15, and 16, these members by preference being integral with each other and the structure as a whole being formed either by being stamped from a suitable piece of metal or by being cast. One end of each of the members is bent at right angles to its length, as shown at 17, and then outward at right angles to the downturned or leg portion to present toes 18, which are secured to the bit-plate, as by being riveted or otherwise attached thereto. The legs 17 serve to hold the three members permanently spaced from the bit-plate to permit mounting therebetween of three sheaves 19, 20, and 21, which may be either grooved or plain, according to the character of rein employed, as before pointed out. The sheaves are held in operative relation to the bit-plate by pins or bolts 22, which pass through openings 23, 24, and 25 in the members 13 and 14 and into the bit-plate, the ends of the pins or bolts being by preference upset or headed to insure of their positive assemblage with the bridge and bit-plate. The sheaves will be associated with their bearings in such manner as readily and easily to rotate thereon, thus to obviate any danger of becoming rust-locked, and to effect this end they may be made of a non-oxidizable metal or of a hard close-grained wood, such as lignum-vitæ, or of any other suitable material.

In the form of embodiment of the invention shown in Fig. 2 the only difference is that a single-sheaved gag-runner 26 is employed in lieu of the double-sheaved gag-runner shown in Fig. 1.

In addition to the parts just described there is provided a line-guide, (shown in Fig. 5,) the same to be associated with the turret-hook of the saddle and comprising a ring 27 for the purpose, two flexible members 28, connected therewith at one end, and sheave-bearing yokes 29, connected with the other ends of the said members. In either arrangement shown, however, whether the gag-runner be single or double sheaved, the same idea of multiplying power on the bit obtains, it of course being understood that with the form of gag-runner shown in Fig. 1 double the pull is exerted on the bit with the same output of power than occurs with the form of gag-runner shown in Fig. 2.

In describing the diagrams shown in Figs. 6, 7, 8, and 9 the arrangement of the rein with relation to the single-sheaved gag-runner shown in Fig. 2 will first be explained. Where it is desired to secure a back and single check-draw, the lines A are connected with the bridle and with the line-guide, as shown in Fig. 6, and in describing the diagrams but one line will be discussed, it being understood that both are arranged in the same way. Thus to secure the back and single check-draw, as shown in Fig. 6, one end of the line is passed through the turret-ring, thence between the sheaves 20 and 21 of the bit, thence around the sheave 19 of the bit, thence over the sheave 30 of the gag-runner, thence around the sheave 29 of the rein-guide, and the free end is then secured in any preferred manner to the bit-plate, as by being hooked around one of the members thereof, the free end of the line being provided with a snap-hook for this purpose. Under this disposition of the lines it will be seen that when the line is drawn upon the bit will be drawn backward in the horse's mouth and at the same time he will be checked. By this arrangement, as in the others shown, the necessity of employment of a checkrein is obviated, and, moreover, by loosening the lines the animal will be allowed to drink without necessitating the dismounting of the driver.

The manner of arrangement of the line shown in Fig. 7 will result in an up and single check-draw. In this arrangement the free end of the line is passed between the sheaves 20 and 21 and around the sheave 19, as described, thence over the sheave 30, thence around the sheave 29 of the line-guide, thence around the sheave 21 of the bit, and the snap-hook carried by the free end of the line is hooked into engagement with a loop 31 on the gag-runner 26. Under this arrangement it will be seen that when the line is drawn upon the animal will not only be checked, but the bit will be drawn upward in a vertical line, thereby forcing it out from between the teeth of the animal.

The arrangement shown in Fig. 8 results in an up and double check-draw and is effected by passing the line between the sheaves 20 and 21 and around the sheave 19, as described, thence over the sheave 6ª of the gag-runner, thence around the sheave 29 of the line-guide, thence over the sheave 6 of the gag-runner, thence down and around the sheave 21 of the bit, and the snap-hook on the free end of the line is brought into engagement with the loop 4 of the gag-runner, as clearly shown in Fig. 1. Under this arrangement it will be seen that when the line is drawn upon a double up-draw and checking will result, thereby in the case of a vicious animal not only forcing the bit from between its teeth, but at the same time putting such draft on its head as to bring it under immediate control.

The arrangement shown in Fig. 9 results in a back and double check-draw and is effected by passing the line between the sheaves 20 and 21 and around the sheave 19, as described, thence over the sheave 6ᵃ of the gag-runner, thence around the sheave 29 of the line-guide, thence over the sheave 6 of the gag-runner, thence down around the sheave 21 of the bit, the snap-hook carried by the free end of the line being hooked into engagement with the member 28 of the line-guide or, if preferred, to the turret-hook. Under this arrangement it will be seen that when the line is drawn upon the bit will be drawn backward in the animal's mouth at the same time he is checked, this latter arrangement being adapted for use on horses that are not vicious, but have hard mouths, and are thus difficult to control.

Under all of the arrangements shown the object sought is accomplished in a thoroughly practical and efficient manner, and by the employment of the bit, bridle, and line-guide such as described in the different forms of embodiment of the invention herein shown the management of a horse, no matter how fractious or vicious, may be easily accomplished by a person of only ordinary strength.

Having thus fully described my invention, what I claim as new, and desire to secure by Letters Patent, is—

1. The combination with a bridle carrying sheave-bearing gag-runners, and a bit carrying on each side a plurality of sheaves, of a sheave-bearing line-guide adapted for detachable connection with a harness-saddle, and lines engaging the sheaves of the different parts, one end of each of the lines being secured against retraction.

2. The combination with a bridle carrying sheave-bearing gag-runners and a bit carrying on each side a plurality of sheaves, of a flexible sheave-bearing line-guide adapted for connection with the saddle of a harness, and lines engaging the sheaves of the different parts, one end of each of the lines being secured to one of the gag-runners.

3. The combination with a bridle, of gag-runners each carrying a plurality of sheaves disposed one above the other, a bit carrying on each side a plurality of sheaves, a flexible sheave-bearing line-guide having an eye for detachable engagement with a hook on the saddle of a harness, and lines engaging the sheaves of the said parts.

In testimony that I claim the foregoing as my own I have hereto affixed my signature in the presence of two witnesses.

HENRY H. POE.

Witnesses:
E. E. DOYLE,
R. M. ELLIOTT.